US006623632B1

(12) United States Patent
Lipovich

(10) Patent No.: US 6,623,632 B1
(45) Date of Patent: Sep. 23, 2003

(54) FLOTATION BATH

(76) Inventor: Diego Alvaro Lipovich, Chacabuco 96, 2° piso, 1069-Buenos Aires (AR)

( * ) Notice: Subject to any disclaimer, the term of this patent is extended or adjusted under 35 U.S.C. 154(b) by 0 days.

(21) Appl. No.: 10/152,644

(22) Filed: May 21, 2002

(51) Int. Cl.$^{7}$ ................................................ B01D 21/30

(52) U.S. Cl. ........................ 210/149; 210/169; 210/184; 210/416.2; 4/493

(58) Field of Search ................................. 210/143, 149, 210/169, 175, 181, 184, 416.1, 416.2; 4/493

(56) References Cited

U.S. PATENT DOCUMENTS

| | | | | |
|---|---|---|---|---|
| 2,884,197 A | * | 4/1959 | Whittell, Jr. | 165/297 |
| 4,330,412 A | * | 5/1982 | Frederick | 210/805 |
| 4,368,549 A | * | 1/1983 | Ramey | 4/493 |
| 4,385,724 A | * | 5/1983 | Ramsauer et al. | 236/25 A |
| 4,660,545 A | * | 4/1987 | Ely | 126/563 |
| 5,415,221 A | * | 5/1995 | Zakryk | 165/283 |
| 5,505,847 A | * | 4/1996 | Yamada et al. | 210/169 |
| 5,526,538 A | * | 6/1996 | Rainwater | 4/541.1 |
| 6,209,148 B1 | * | 4/2001 | Hoffman et al. | 4/496 |
| 2002/0050490 A1 | * | 5/2002 | Pittman et al. | 219/481 |

* cited by examiner

*Primary Examiner*—Fred Prince
(74) *Attorney, Agent, or Firm*—Pendorf & Cutliff

(57) ABSTRACT

A floating bath assembly in which the user gets into an open tank in which he rests floating in a slightly heated high-density saline solution in a decubitus dorsal position. The tank has an electrical means for heating the solution, and in the lower part of the tank, there is a connection to an extraction tube of the liquid. The liquid is taken to a reservoir that has an electric resistance, which, at the same time, is connected to a filling tube that uses a valve to allow the tank to be filled again so the user may fill the tank with the high-density saline solution each time it takes a bath.

5 Claims, 2 Drawing Sheets

FLOTATION BATH

FIELD OF THE INVENTION

This invention relates to a flotation bath, more particularly, to a device wherein the user remains floating in a decubitus dorsal position in a slightly warm high-density saline solution.

In this type of floating baths, having a great percentage of salt in the salt solution, such buoyancy is achieved due to the density of the bath liquid, in which the user, lying on his or her back achieves a high level of relaxation.

It has been proved that floating alleviates stress, anxiety and chronic pain.

BACKGROUND OF THE INVENTION

Said type of therapeutic floating baths, in which the user introduces himself in a housing that has the salt solution in its lower part and a cover in the upper part, is already known in the art. In some cases said cover is removable.

The salt solution is a mixture of water and Epsom salt (Magnesium sulfate).

One of the drawbacks of this type of floating bath is, on one part, the resistance from the user to remain inside a closed housing, especially if the user suffers from some level of claustrophobia, and, on the other part, the resistance to remain partially submerged in a salt solution that has been used before by other persons.

By means of the device of the present invention the user will not resist nor reject this type of bath as he fills the bath with the solution when he wants to take a bath.

Also each time the tank is emptied and refilled the solution is filtered.

In U.S. Pat. No. 5,505,847 a bath that circulates and recycles a multiple mineral salt solution is disclosed but in this case the solution, which is not a high density salt solution, is not kept slightly warm in a reservoir for further immediate use and neither is heated while the user takes a bath as in present invention.

German patent DE 3932 199 A1 discloses a bath with a reservoir and a sterilization device but it doesn't mention that it is appropriate for a high-density salt solution floating bath or that the solution is kept slightly warm for immediate use thereof.

European patent Nr 0 300 639 from Inax Corporation discloses a shower bath with two tanks with cold and hot water respectively and a mixing valve responsive to a signal from a regulator to control the temperature and pressure of the water flowing from the tanks to the shower, something that can't be done with a high-density saline solution.

In U.S. Pat. No. 4,150,665 a heater for liquid containers is disclosed, in which a thermally conductive plate is in direct communication through hollow extensions with liquid in the container, but this heater arrangement can't be applied in the arrangement of subject invention as the flow of the high-density saline solution through the hollow extensions is very difficult.

U.S. Pat. No. 4,385,724 discloses a water temperature sensing and control apparatus for a spa or hot water tub always full in which a water pump continually operates to circulate the water from the tub through a sensing bulb connected to switching means that open or close the energy for the water heating element, while in the flotation bath of this invention the solution is kept warm in a reservoir and is transferred to the tank when the user will take a bath.

OBJECT OF THE INVENTION

The main object of the present invention is a floating bath including a tank for containing a high-density salt solution. The novelty of the invention is that said tank has means for the heating of the solution, and in the lower part of said tank a liquid extraction pipe, including a pump and a filter, is engaged to empty the tank. The outlet of said extraction pipe being. connected to a reservoir, the reservoir also having means for heating the solution, the outlet in the bottom of the reservoir being also connected to a filling pipe that includes a valve, the outlet of the filling pipe being connected to said tank to fill it with said solution.

In a preferred embodiment of the invention the pump in said extraction pipe is turned on only when the solution is to be transferred to the reservoir.

In a preferred embodiment of the invention said reservoir includes means for the heating of the salt solution which is connected to a thermostat for the regulation of the temperature of the solution, and a device to control the level of said solution so that the quantity of the solution doesn't go beyond a predetermined value.

In a further embodiment of the invention said valve is in electrical communication with said pump so when it is closed it activates said pump to empty the solution in the tank and send it to the reservoir.

In the aforementioned preferred embodiment of the invention said reservoir is placed above the level of the solution of the tank.

BRIEF DESCRIPTION OF THE DRAWINGS

The advantages as well as the main object of the invention will be discussed in the following description of the preferred embodiment of the invention with reference to the enclosed drawings, wherein.

DESCRIPTION OF THE PREFERRED EMBODIMENT

Figure 1:
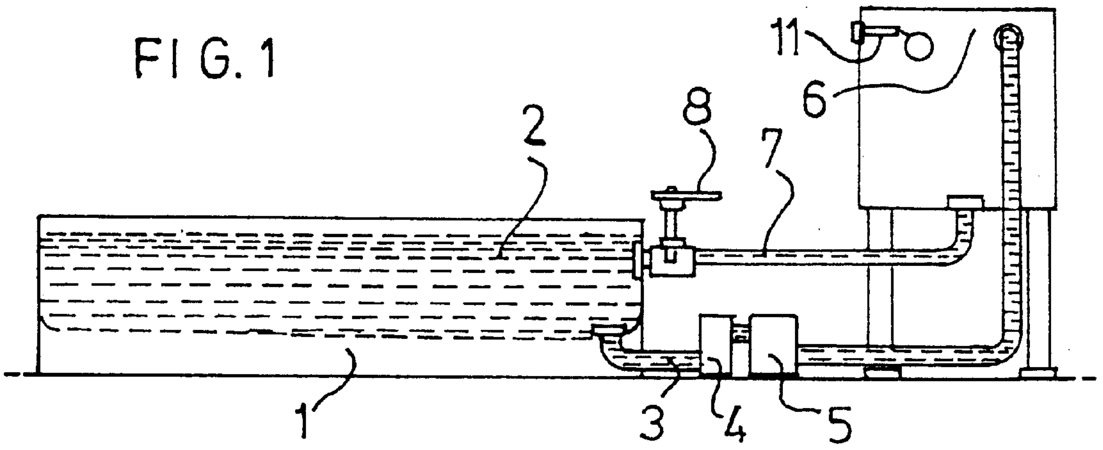
FIG. 1 is a diagram of the arrangement of the invention.

FIG. 1 shows a tank (1) with its superior part uncovered filled, up to a certain level, with a high-density salt solution (2)—with a high content of not-irritant salts—that confer to the solution buoyancy characteristics due to its density, with which the human body can float freely lying down inside the tank (1) in a decubitus dorsal position without the need of making movements.

In the lower part of the tank (1) there is an outlet for the solution that connects said tank (1) with a pipe (3) for the extraction of the salt solution. Said tube has in its path, a filter (4) and an electrically driven pump (5) with the outlet connected to the upper part of a reservoir (6) which has a device to control the level (11) and in its lower part has an outlet connected to filling pipe (7) that in its path and next to its outlet has a valve (8).

Figure 2:
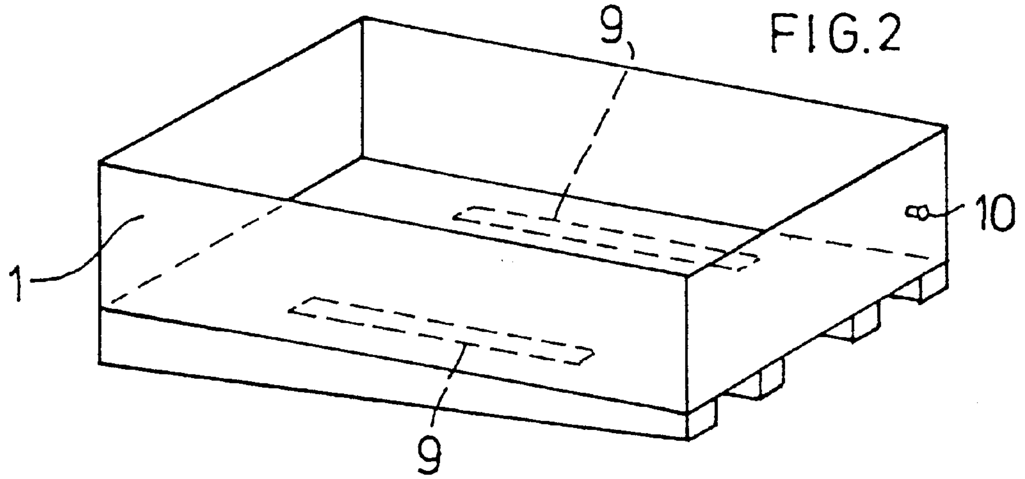
FIG. 2 is a view in perspective of the empty tank.

FIG. 2 shows the empty tank (1). It can be seen that its bottom is slightly inclined towards the area where the extraction pipe (3) is connected. Said bottom part includes the heating means (9), constituted by electric resistances for the heating of the salt solution when the tank is full. Thermostat (10) controls the salt solution temperature by switching on and off said heating means (9).

Figure 3:
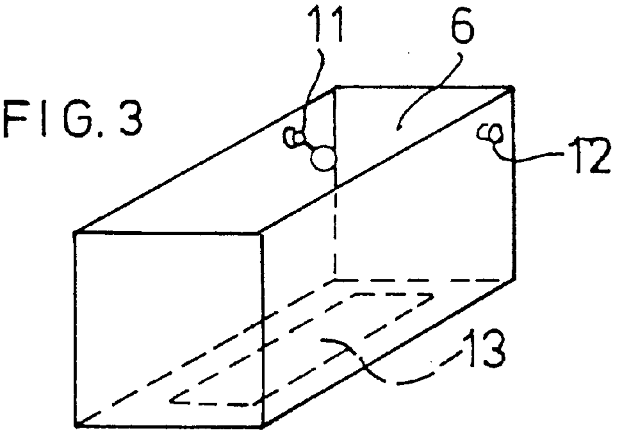
FIG. 3 is a view in perspective of the empty reservoir.

FIG. 3 shows the reservoir (6) (for salt solution) that, in its lower part includes the heating means (13) constituted by an electrically submergible resistance that heats the salt solution, and that its temperature is regulated by the thermostat (12), so that the temperature of the solution in the reservoir (6) is the same temperature that the solution (2) will have when filling tank (1).

What follows is a description of how the bath works. When the user wants to use said bath, the salt solution is already in the reservoir (6) at a predetermined temperature.

When the user turns on the valve (8) to the open position, the salt solution enters to tank (1), due to gravity, through the filling tube (7) until the reservoir (6) is empty and the tank (1) is full. At the same time it switches off the control of the reservoir level (11) the heating resistance (13) and the thermostat (12) controlling the temperature, see FIG. 4, while also the heating resistances (9) and the thermostat (10) are switched on with switch (15).

Figure 4:
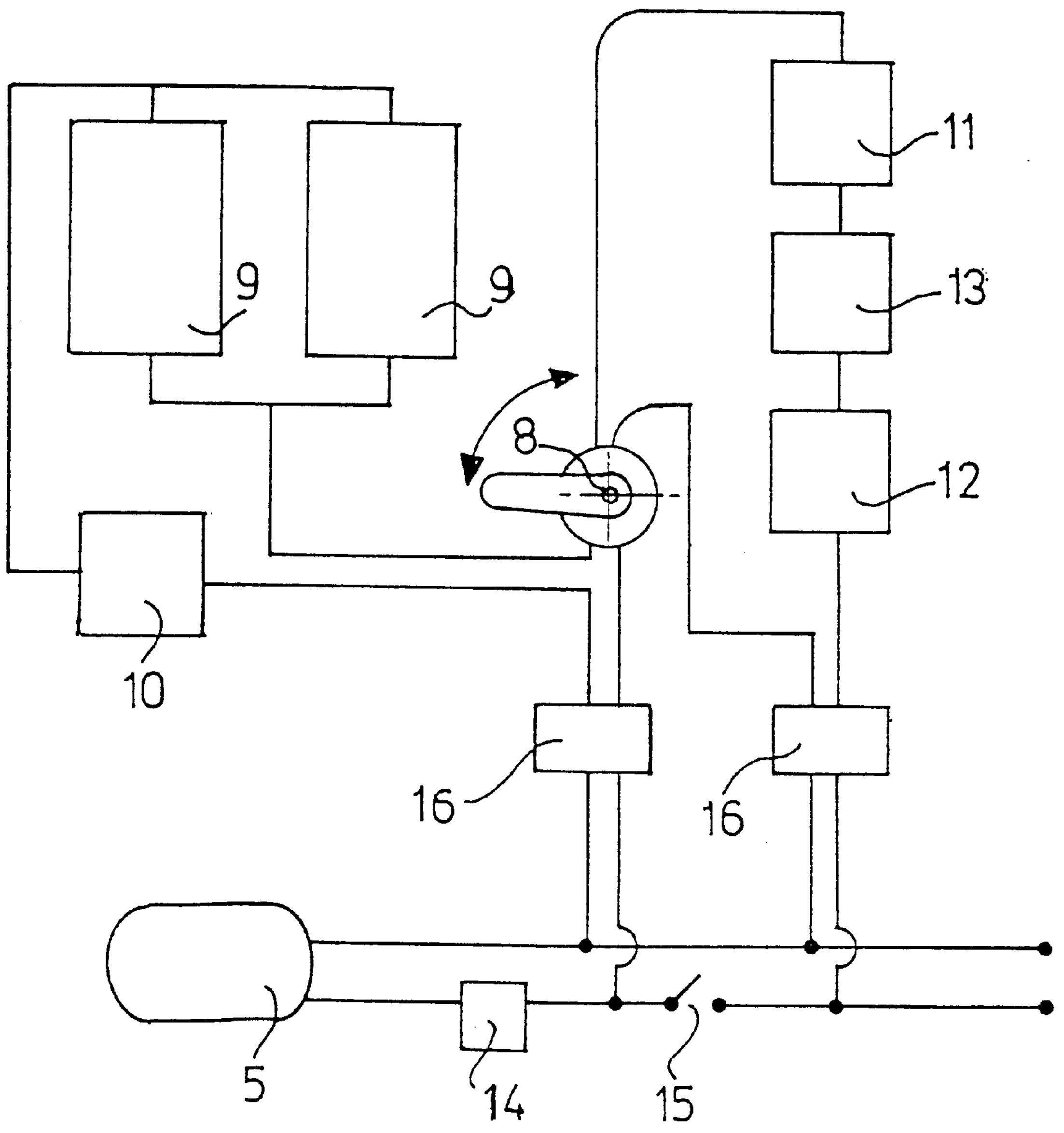
FIG. 4 is a diagram of the electric circuit of the arrangement of the invention.

When the user finishes bathing, closes the valve (8) by turning it back to the closed position—opposite direction from the opening one—and activates the pump (5) that extracts the saline solution from the tank (1). After the filtering of the solution by the filter (4), it is sent again to the reservoir (6). At the same time, as shown in FIG. 4, the resistances (9) and thermostat (10) are disconnected while the resistances (13) and the thermostat (12) are switched on.

The pump (5) is connected to a timing circuit (14) in order to stop the pump (5) after a predetermined lapse of time, which is the time needed to empty the tank (1).

Being the salt solution conductive, the electrical circuits are protected by automatic circuit breakers (16).

The level control (11) detects the lack of salt solution, this lack is due to the evaporation of the solution as it is at a slightly higher temperature than the room temperature and also because when the users get out of the bath they take out some of the solution adhered to the body.

The temperature of the saline solution is continually maintained in the tank (1) and in the reservoir (6) at a level that is slightly below the body normal temperature, which ensures that there is a very low heat exchange between the user's body and the saline solution.

What is claimed is:

1. A floating bath including: a tank containing a salt solution characterized in that said tank has means for the heating of the high-density solution, and in its lower part said tank is engaged to an extraction pipe, to empty the tank, that includes a pump and a filter; the outlet of said extraction pipe being connected to a reservoir that also includes heating means for heating the solution; an outlet in the bottom of said reservoir being also connected to a filling pipe that includes a valve, the outlet of the filling pipe being connected to said tank to fill it with said solution.

2. The floating bath in accordance with claim 1, wherein the pump in said extraction pipe is turned on only when the solution is to be transferred to the reservoir.

3. The floating bath in accordance with claim 1, wherein said reservoir includes means for the heating of the solution in the reservoir which is connected to a thermostat for the regulation of the temperature of the solution, and a device to control the level of said solution so that the quantity of the solution doesn't go beyond a predetermined value.

4. The floating bath in accordance with claim 1, wherein said valve is in electrical communication with said pump so to activate said pump to empty the solution in the tank and send it to the reservoir.

5. The floating bath in accordance with claim 1, wherein said reservoir is placed above the level of the solution in said tank.

* * * * *